United States Patent [19]
Sakamoto et al.

[11] Patent Number: 5,446,257
[45] Date of Patent: Aug. 29, 1995

[54] WELDING METHOD AND WELDING DEVICE

[75] Inventors: Hiroki Sakamoto, Yokohama; Kimihiro Shibata, Yokosuka; Kiyokazu Mori, Atsugi, all of Japan

[73] Assignee: Nissan Motor Co., Ltd., Yokohama, Japan

[21] Appl. No.: 218,630

[22] Filed: Mar. 28, 1994

[30] Foreign Application Priority Data

Apr. 1, 1993 [JP] Japan ................... 5-075996

[51] Int. Cl.$^6$ ................... B23K 26/00; B23K 26/02
[52] U.S. Cl. ................... 219/121.63; 219/121.83; 219/124.34; 219/121.78
[58] Field of Search ................... 219/121.64, 121.83, 219/121.63, 124.34, 121.78

[56] References Cited
U.S. PATENT DOCUMENTS

| | | | |
|---|---|---|---|
| 2,994,763 | 8/1961 | Schultz | 219/123 |
| 4,634,832 | 1/1987 | Martyr | 219/121.63 |
| 4,918,517 | 4/1990 | Burgoon | 358/101 |

*Primary Examiner*—Mark H. Paschall
*Attorney, Agent, or Firm*—Foley & Lardner

[57] ABSTRACT

During melting and jointing members 2, 3 to weld the members by applying a laser beam 5 to the members while supplying a filler wire 13 to the locally heated portion of the members, welding plasma intensities are measured by sensors 8, 9 from both sides of the locally heated portion with reference to an advancing direction of welding. When the welding plasma intensities measured from both sides of the locally heated portion are largely different from each other, the relative deviation between the laser beam 5 and the filler wire 13 is large, so that a good welding may be difficult to be carried out. Based on this recognitions, the relative position between the laser beam 5 and the filler wire 13 is corrected during welding to prevent occurrence of weld inferiority, so that the occurrence of weld inferiority due to the relative deviation between the the laser beam 5 and the filler wire 13 can be effectively prevented, thereby scrapped inferior members can be decreased providing a reduction of costs of materials and an improvement of weld efficiency.

1 Claim, 8 Drawing Sheets

FIG_1
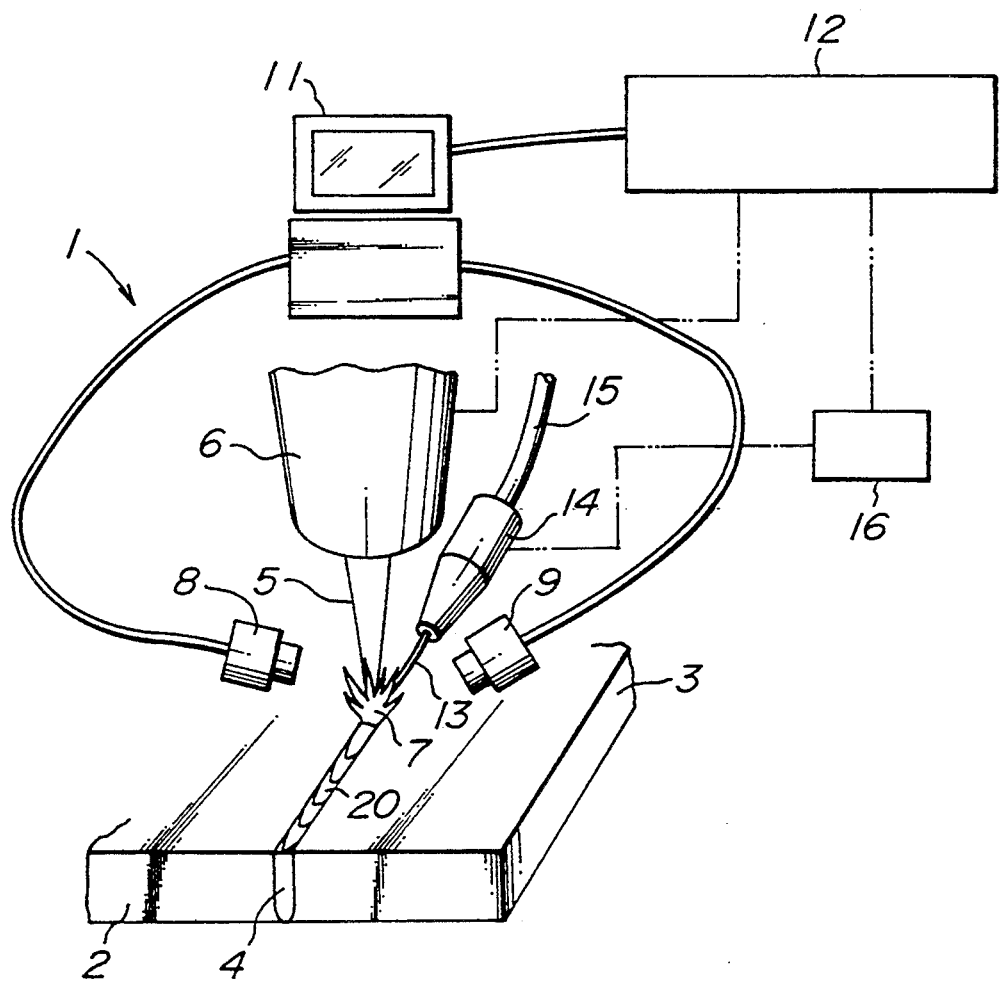

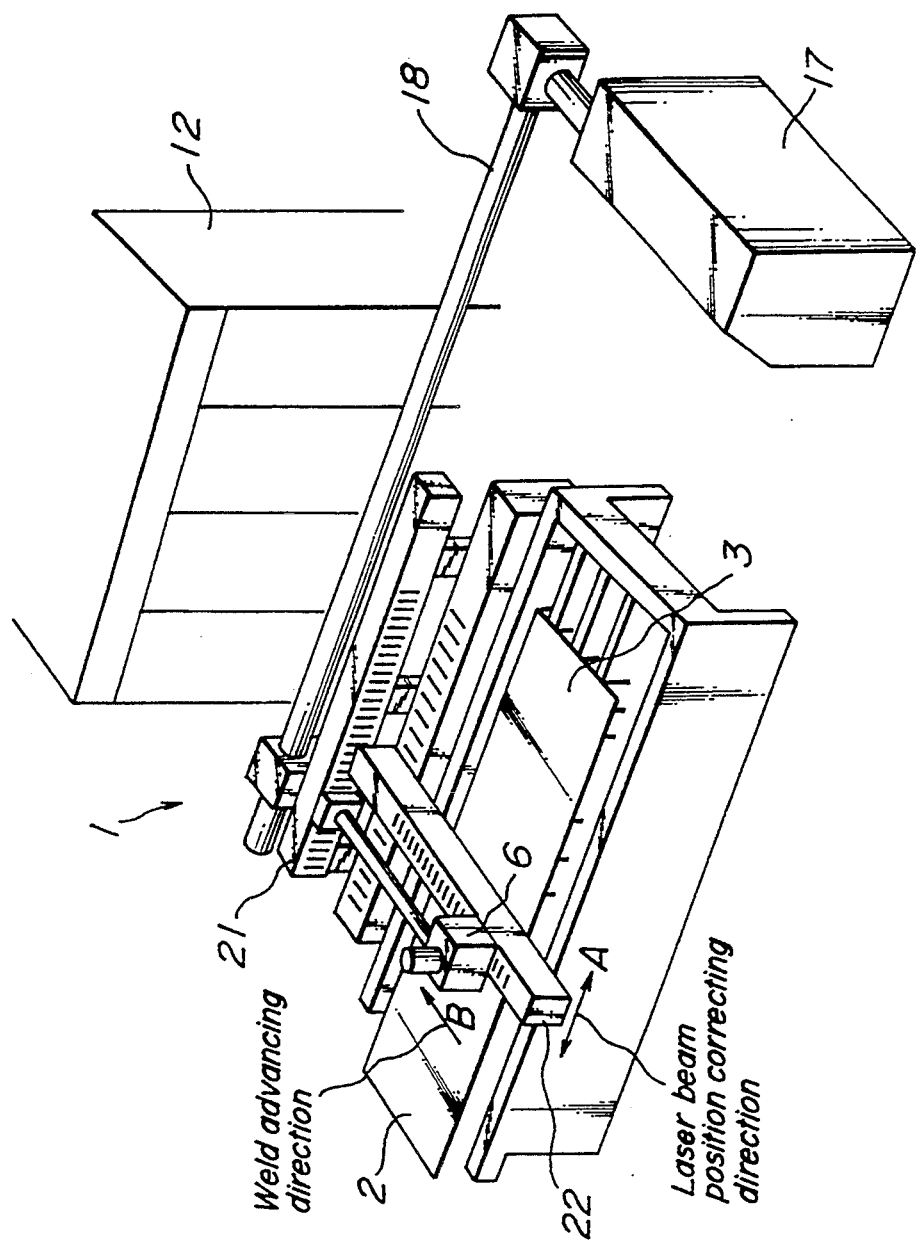

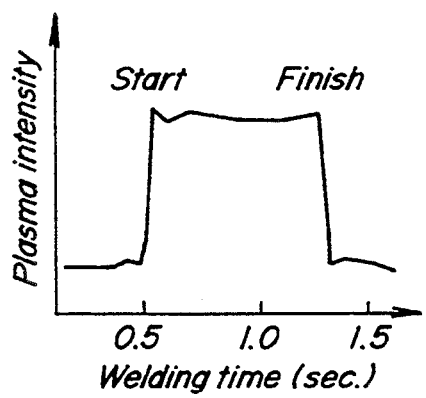
FIG_3B
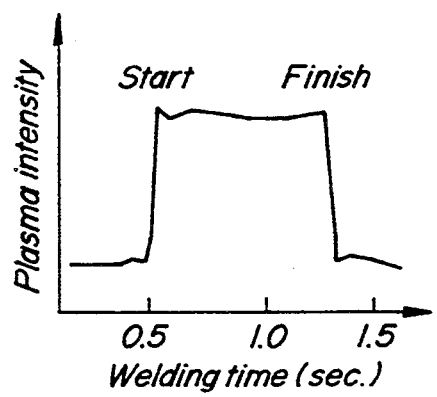
FIG_3C
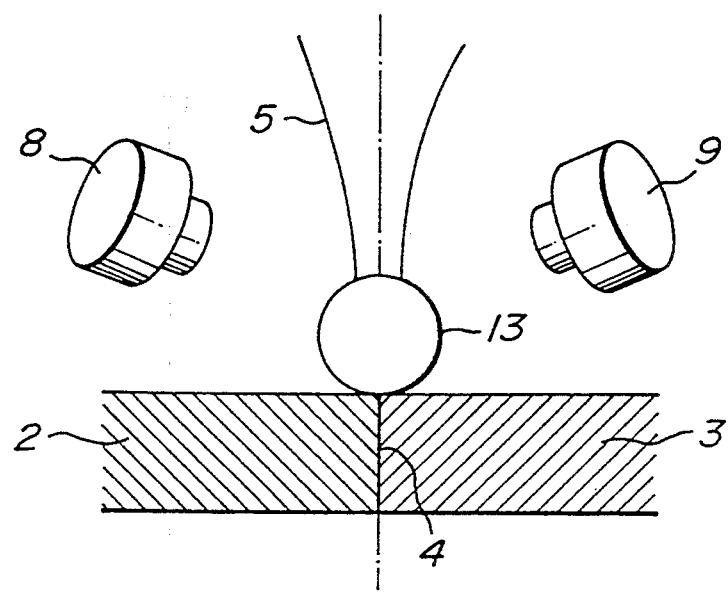
FIG_3A

FIG_5B
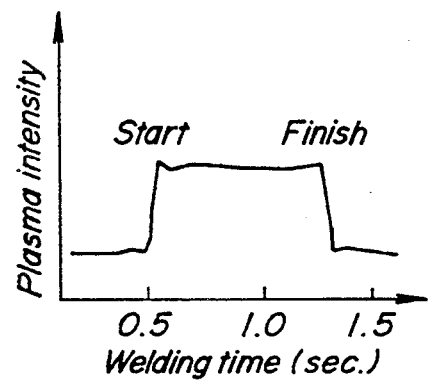
FIG_5C
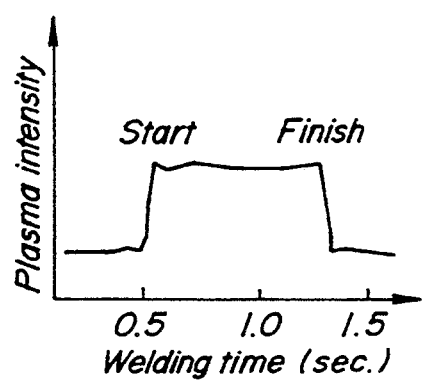
FIG_5A
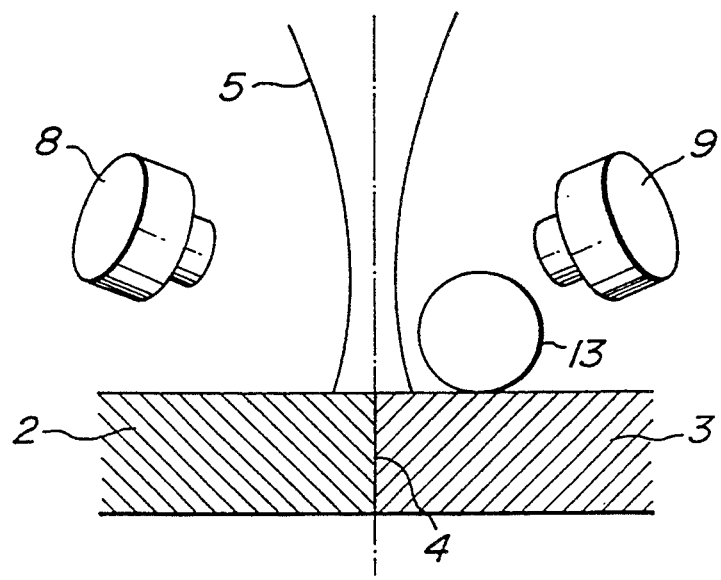

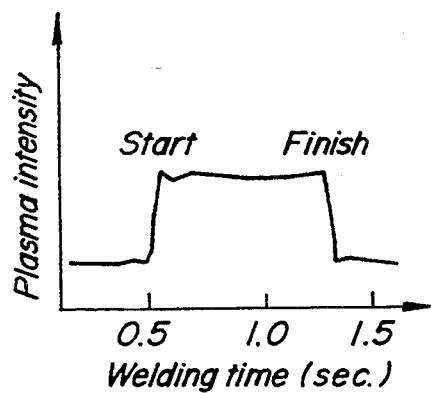
FIG_6B
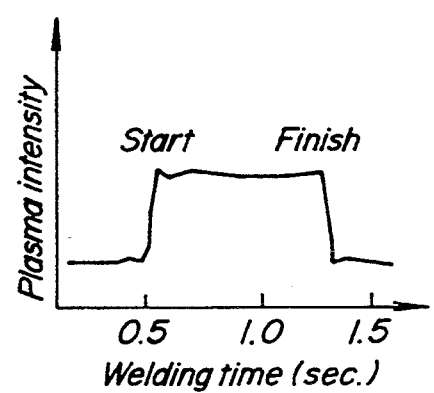
FIG_6C
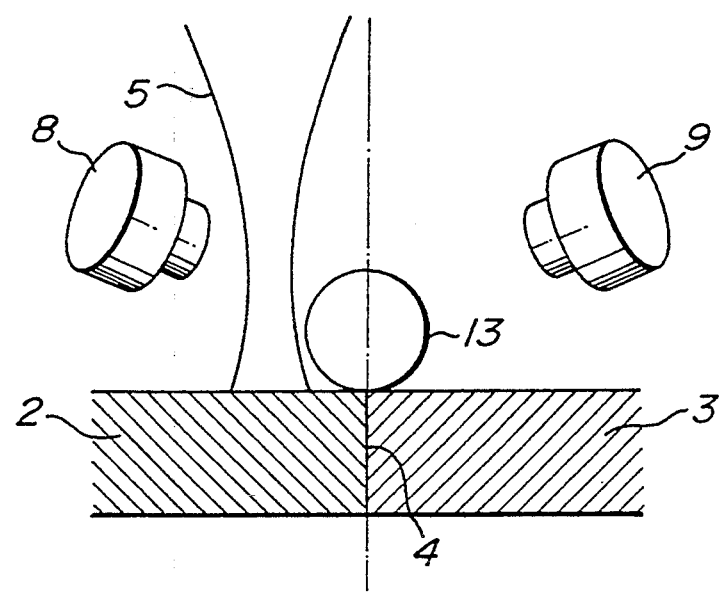
FIG_6A

FIG_7B
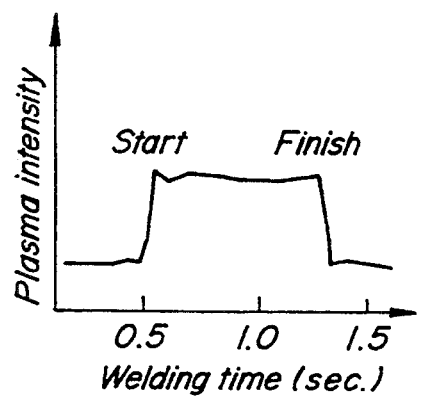
FIG_7C
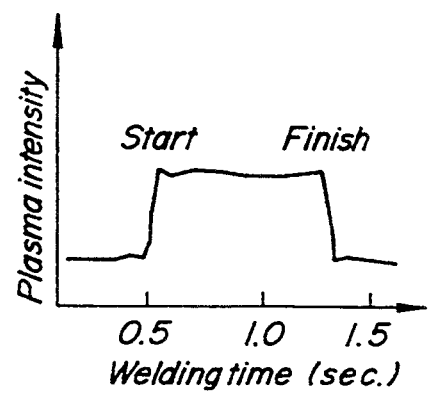
FIG_7A
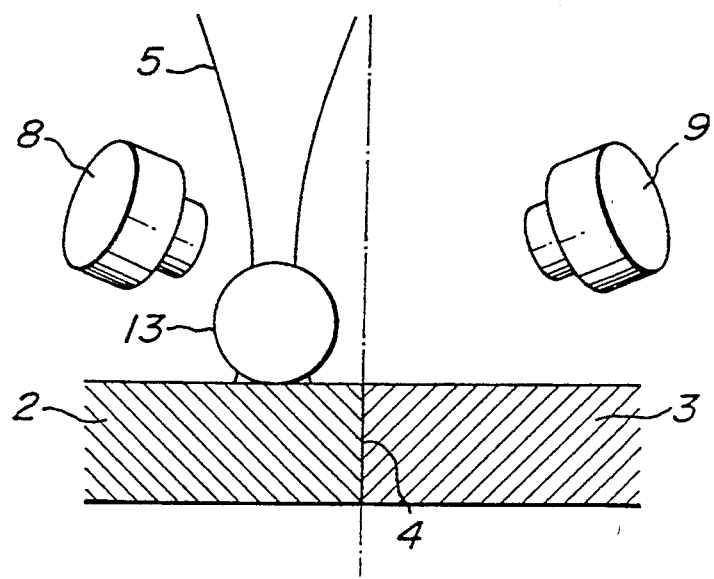

WELDING METHOD AND WELDING DEVICE

BACKGROUND OF THE INVENTION

1. Field of the invention

The present invention relates to a welding method and a welding device which are utilized for melting and jointing members, to weld the members by applying a local heat supply such as a laser beam, etc., to surfaces of the members to be welded, while supplying a filler wire to the locally heated portion of the surfaces.

2. Description of the Related Art

A locally heating welding method using a local heat supply, such as a laser beam etc., provides a little heat input to members to be welded. This results in little welding distortion. Therefore, the locally heating welding method is utilized for butt welding and lap welding of thin steel sheets. The reason for little heat input is that the welding method enables applying the local heat supply, such as a laser beam etc., into a very small area and thereby enabling a concentration of energy of the local heat supply.

However, on the other hand, the locally heating welding method has drawbacks that an allowable bound of a deviation of the applying area of the local heat supply from a desired portion of the members to be welded is so narrow, and further, an allowable bound of a magnitude of the gap between the members is so narrow.

Consequently, e.g., in butt welding of thin steel sheets, the welding is sometimes accompanied with supplying a filler wire to enlarge the allowable bound of magnitude of the gap. However, in this case, allowable bound of the magnitude of the gap is enlarged, while a new problem of a deviation of the applying area of the local heat supply from the filler wire arises. The deviation of the applying area of the local heat supply from the filler wire results in non-uniform and non-steady melting of the filler wire causing humping of a weld bead. This humping makes it difficult to obtain a required weld strength.

To reduce occurrence of weld inferiority from humping, prior welding methods generally raise a mechanical accuracy of a filler wire supplying device and/or raise an accuracy of an optical system for the local heat supply such as a laser beam etc. Furthermore, as shown in FIGS. 8A, 8B, e.g. for melting and jointing abutting members 52, 53 to be welded, by applying a laser beam 55 to the abutting portion 54 of the members 52, 53 while supplying a filler wire 56 to the abutting portion 54, a prior welding method increases the diameter of the laser beam 55 than that of the filler wire 56 to enlarge the allowable bound of the deviation of the applying area of the laser beam 55 from the filler wire 56.

Though, such prior welding methods can not suppress essentially the occurrences of above mentioned weld inferiority, so that in general, an inferiorly welded part detecting device which detects a inferiorly welded part after welding is provided in a prior welding device to prevent supplying inferior goods to a posterior manufacturing process.

As a welding device having a inferior part detecting device detects an inferiorly welded part by inspecting a form of a weld bead after welding. A welding device which takes a picture of the form of the weld bead by an industrial television (ITV) camera is previously known in Japanese Patent Application Laid Open No. 40692/88, which welding device then inputs and processes the form of the weld bead as an image to detect inferior forms of the weld bead.

However, the above mentioned increasing of the diameter of the laser beam than that of the filler wire causes decreasing of power density of the laser beam which makes the welding device to slow down the welding speed, and further causes increasing of the width of the weld bead resulting a large welding distortion.

On the other hand, the above mentioned inspecting of the form of the weld bead enables only judgement of good or inferior forms of the weld bead after welding. Consequently, since welding conditions can not be corrected by the inspection of the form of the weld bead, the welded members having inferiorly welded portion must be scrapped, so that especially in the case of large members, costs of materials become very expensive.

Thus, it has been proposed to provide a welding method and a welding device which enable preventing occurrence of above mentioned weld inferiority by correcting welding conditions during welding instead of detecting weld inferiority after welding.

It is an object of the invention to provide a welding method and a welding device which method and device enable preventing occurrence of weld inferiority due to the relative deviation between the applying area of the laser beam and the filler wire, during melting and jointing members to weld the members by applying a local heat supply to surfaces of the members while supplying a filler wire to the locally heated portion of the surfaces, thereby decreasing scrapped inferior members and reducing costs of materials and improving weld efficiency.

SUMMARY OF THE INVENTION

The welding method according to the invention is characterized in that during melting and jointing members to weld the members by applying a local heat supply to surfaces of the members, while supplying a filler wire to the locally heated portion of the surfaces, welding plasma intensities are measured from both sides of the locally heated portion with reference to an advancing direction of welding.

The welding method according to the invention enables recognition when the welding plasma intensities measured from both sides of the locally heated portion with reference to an advancing direction of welding are both strong and substantially equal to each other. The relative deviation between the applying area of the local heat supply and the filler wire is small, so that a good welding may be carried out, on the other hand, when the welding plasma intensities measured from both sides of the locally heated portion are largely different from each other, the relative deviation between the applying area of the local heat supply and the filler wire is large, so that a good welding may be difficult to be carried out. Furthermore, when the welding plasma intensities measured from both sides of the locally heated portion are both weak and substantially equal to each other, the relative deviation between the applying area of the local heat supply and the filler wire is too large, so that a good welding may not be carried out.

Consequently, based on the above mentioned recognitions, a welding condition can be watched and corrected during welding to prevent occurrence of weld inferiority, so that the occurrence of weld inferiority due to the relative deviation between the applying area of the local heat supply and the filler wire can be effectively prevented, thereby scrapped inferior members can be decreased providing a reduction of costs of materials and an improvement of weld efficiency.

In the welding method according to the invention, the relative position between the filler wire and the local heat supply may be corrected so as to maintain a magnitude of a difference between the welding plasma intensities measured from both sides of the locally heated portion lower than a certain value.

This enables automatic control of a welding condition based on the measured welding plasma intensities, which is advantageous for achieving automatic welding to reduce production costs.

The invention also includes a welding device to carry out welding effectively according to the above mentioned welding method.

The welding device according to the invention is characterized in that the device comprises a local heat supply for locally heating and melting surfaces of members to weld the members, a wire supply means for supplying a filler wire to the locally heated portion of the surfaces, and a plasma intensity measuring means for measuring welding plasma intensities from both sides of the locally heated portion with reference to an advancing direction of the welding.

The welding device according to the invention may further comprise a relative position correcting means for correcting the relative position between the filler wire and the local heat supply so as to maintain a magnitude of a difference between the welding plasma intensities measured from both sides of the locally heated portion lower than a certain value.

Further, the local heat supply according to the invention may be a laser beam.

BRIEF DESCRIPTION OF THE DRAWINGS

The present invention will now be explained in more detail with reference to a preferred embodiment shown in the attached drawings, in which:

FIG. 1 shows a basic construction of an example of the welding device according to the invention and an oblique view of a laser beam irradiating part thereof.

FIG. 2 shows an oblique view of almost all of the welding device.

FIG. 3A schematically shows abutting members to be welded, a filler wire and a laser beam in the welding device, wherein the filler wire and the laser beam are both in normal relative positions to each other and to the abutting members.

FIG. 3B shows a variation of a welding plasma intensity with time during welding measured by a lefthand plasma sensor.

FIG. 3C shows a variation of a welding plasma intensity with time during welding measured by a righthand plasma sensor, which intensities are measured in the relative positions of the filler wire and the laser beam to the abutting members shown in FIG. 3A.

FIG. 5A schematically shows abutting members to be welded, a filler wire, and a laser beam in the welding device. The laser beam is in a normal relative position to the abutting members while the filler wire is in a fully deviated relative position to the abutting members, and the filler wire is fully deviated from the applying area of the laser beam, so that the laser beam is not applied to the filler wire.

FIG. 5B shows a variation of a welding plasma intensity with time during welding measured by a lefthand plasma sensor.

FIG. 5C shows a variation of a welding plasma intensity with time during welding measured by a righthand plasma sensor, which intensities are measured in the relative positions of the filler wire and the laser beam to the abutting members shown in FIG. 5A.

FIG. 6A schematically shows abutting members to be welded, a filler wire, and a laser beam in the welding device. The filler wire is in a normal relative position to the abutting members while the laser beam is in a fully deviated relative position to the abutting members, and the filler wire is fully deviated from the applying area of the laser beam, so that the laser beam is not applied to the filler wire.

FIG. 6B shows a variation of a welding plasma intensity with time during welding measured by a lefthand plasma sensor.

FIG. 6C shows a variation of a welding plasma intensity with time during welding measured by a righthand plasma sensor, which intensities are measured in the relative positions of the filler wire and the laser beam to the abutting members shown in FIG. 6A.

FIG. 7A schematically shows abutting members, a filler wire and a laser beam in the welding device, wherein the filler wire and the laser beam are both in normal relative positions to each other while they are both in fully deviated relative positions to the abutting members.

FIG. 7B shows a variation of a welding plasma intensity with time during welding measured by a lefthand plasma sensor, and FIG. 7C shows a variation of a welding plasma intensity with time during welding measured by a righthand plasma sensor, which intensities are measured in the relative positions of the filler wire and the laser beam to the abutting members shown in FIG. 7A.

DETAILED EXPLANATION OF THE PREFERRED EMBODIMENT

Figure 4B:
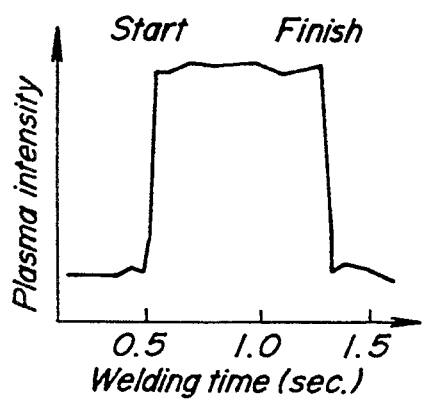
FIG. 4B shows a variation of a welding plasma intensity with time during welding measured by a lefthand plasma sensor.
Figure 4C:
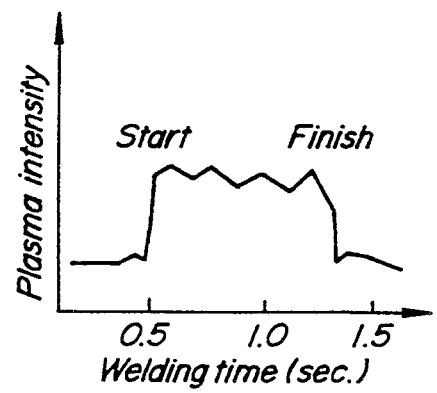
FIG. 4C shows a variation of a welding plasma intensity with time during welding measured by a righthand plasma sensor, which intensities are measured in the relative positions of the filler wire and the laser beam to the abutting members shown in FIG. 4A.

FIG. 1 and FIG. 2 show a basic construction of an example of the welding device according to the invention, which welding device 1 comprises a machining head 6 of a laser machining device for focusing and applying a laser beam 5 as a local heat supply onto an abutting portion 4 of abutting members 2 and 3 to be welded. A lefthand plasma sensor 8 and a righthand plasma sensor 9 as a plasma intensity measuring means for measuring intensities of welding plasma 7 produced at a portion locally heated by the laser beam 5, from both sides of the locally heated portion with reference to an advancing direction of welding. The plasma sensors 8, 9 are fixed to the both sides of the machining head 6 with reference to an advancing direction of the welding.

The welding device 1 further comprises a data analyzer 11 for analyzing the intensity data output from the plasma sensors 8 and 9. A machining control device 12 for controlling a position of the machining head 6, etc., and the laser beam 5 based on the result of the analyzing by the data analyzer 11, a wire feeding nozzle 14, and a wire feeding flexible conduit 15 as a wire supply means for supplying a filler wire 13 to the portion locally heated by the laser beam 5, wherein the data analyzer 11 and the machining control device 12 may individually or integrally consist of so-called a personal computer or a micro computer.

As shown in FIG. 2, the laser beam 5 to be irradiated from the machining head 6 of the laser machining device is produced by a laser oscillator 17 and transmitted to the machining head 6 through an optical system 18 for transmitting a beam. Regarding such a constitution, the welding device 1 further comprises a correcting driver 21 as a relative position correcting means for correcting the relative position between the filler wire and the laser beam, which driver 21 is controlled by the machining control device 12 and drives the machining head 6 to move the machining head 6 to correcting directions shown as a double arrow A, maintaining the optical system 18.

The welding device 1 further comprises a welding driver 22, which driver 22 is controlled by the machining control device 12 and drives the machining head 6 to move the machining head 6 to an advancing direction of welding which is a direction shown as an arrow B or not shown reversed direction, maintaining the optical system 18.

To correct a relative position of the wire feeding nozzle 14 to the abutting portion 4 of the abutting members 2, 3 and hence to the machining head 6, the welding device 1 further comprises an actuator 16 as another relative position correcting means, which actuator 16 is controlled by the machining control device 12 and is mechanically independent from the above mentioned drivers 21, 22, and which actuator 16 drives the wire feeding nozzle 14 to move the nozzle 14 together with the machining head 6.

When using the welding device 1 for carrying out butt weld to the abutting members 2 and 3 to obtain a weld joint having a weld bead 20, the laser beam 5 is produced by the laser oscillator 17 and transmitted to the machining head 6 through the optical system 18 then irradiated from the machining head 6 and applied to the abutting portion 4, while the wire feeding nozzle 14 supply the filler wire 13 to the abutting portion 4. Therefore, the laser beam 5 locally heats both the filler wire 13 and the abutting portion 4 of the abutting members 2 and 3, forming a molten pool as a so-called keyhole at the applying portion, so that the welding plasma 7 is produced at the molten pool.

The intensities of such the welding plasma 7 are measured by the lefthand and righthand plasma sensors 8, 9 from both sides of the locally heated portion with reference to an advancing direction of the welding, then these plasma intensity data are fed to the data analyzer 11 so as to be calculated and analyzed the intensities and the difference of the intensities.

A relationship between the plasma intensities and the relative position between the laser beam 5 and the filler wire 13 which is clarified on experimental study by the inventors of the present invention is as follows.

In the experimental study it has been clarified that an angle between the plasma sensor directed to the welding portion and the surface of the member can be about 5 to 80 degrees, though, the angle of the plasma sensor is set preferably about 10 degrees to ensure a high sensitivity of the sensor because wider angle of the plasma sensor reduces the sensitivity thereof, and the plasma sensor is set preferably perpendicular to the advancing direction of welding to clarify the difference of the plasma intensities.

If it is difficult to arrange the plasma sensors in the position as mentioned above due to an interference with a machining jig or the member, the difference of the plasma intensities may be measured by the plasma sensors arranged in at least symmetrical positions with reference to the laser beam and in both side with reference to an advancing direction of welding.

When the filler wire 13 is provided exactly at the abutting portion 4 of the abutting members 2 and 3 while the laser beam 5 is applied exactly to the center of the filler wire 13 as shown in FIG. 3A, the filler wire 13 and the laser beam 5 are both in normal relative positions to each other and to the abutting members 2, 3, so that normal welding is being carried out under normal relative positions of the laser beam 5 and the filler wire 13 to the abutting portion 4.

In this case, the values of the welding plasma intensities are both high and there is substantially no difference between the values as shown in FIG. 3B and FIG. 3C.

On the other hand, as shown in FIG. 4A, FIG. 5A, FIG. 6A and FIG. 7A, when at least one of the filler wire 13 and the applying area of the laser beam 5 is deviated from the abutting portion 4 of the abutting members 2 and 3, the values of the welding plasma intensities may be varied from the values shown in FIG. 3B and FIG. 3C in case of the normal relative positions, due to occurrence of the weld inferiority.

Figure 4A:
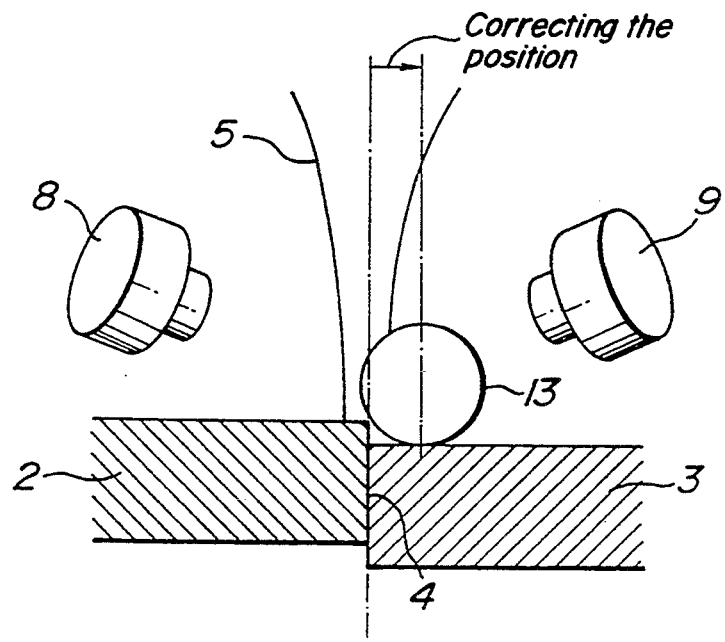
FIG. 4A schematically shows abutting members to be welded, a filler wire, and a laser beam in the welding device. The laser beam is in a normal relative position to the abutting members while the filler wire is in a slightly deviated relative position to the abutting members, and the filler wire is slightly deviated from the applying area of the laser beam, so that the laser beam is partially applied to the filler wire.
Figure 8A:
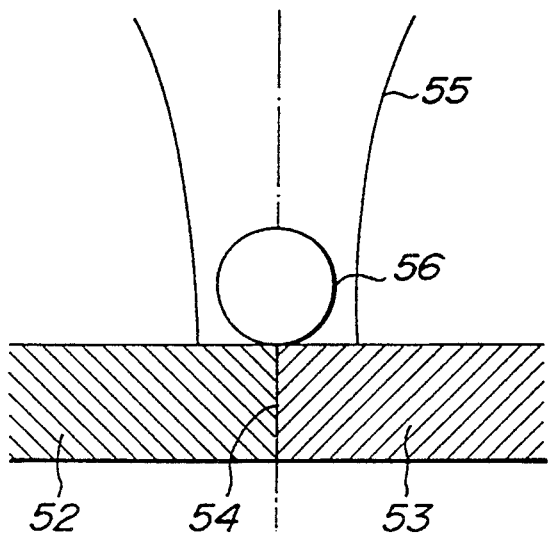
FIG. 8A and 8B both schematically show a prior welding method which increases the diameter of the laser beam than that of the filler wire to enlarge the allowable bound of the deviation of an applying area of the laser beam.
Figure 8B:
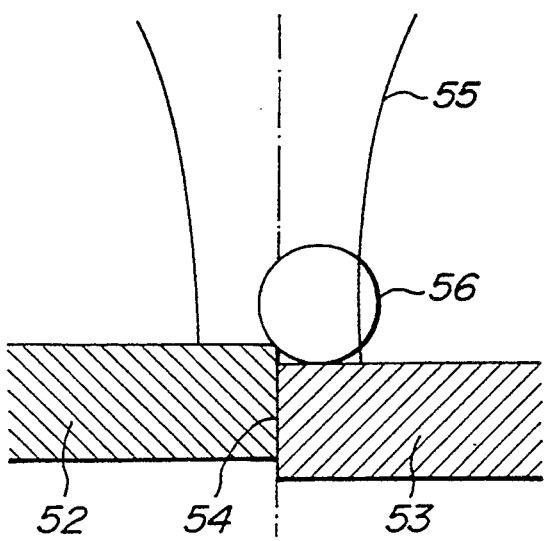

Following cases can be supposed as combinations of the deviations of the filler wire 13 and the laser beam 5 from the abutting portion 4, that is, e.g. a case when the laser beam 5 is exactly positioned at the abutting portion 4 while the filler wire 13 is slightly deviated from the abutting portion 4 so that the filler wire 13 is slightly deviated from the laser beam 5 and the laser beam 5 is partially applied to the filler wire 13 as shown in FIG. 4A, and a case when the filler wire 13 is exactly positioned at the abutting portion 4 while the laser beam 5 is slightly deviated from the abutting portion 4 so that the laser beam 5 is slightly deviated from the filler wire 13 and is partially applied to the filler wire 13 (this case is not shown).

Following cases can be further supposed, that is, a case when the laser beam 5 is exactly positioned at the abutting portion 4 while the filler wire 13 is fully deviated from the abutting portion 4 so that the filler wire 13 is fully deviated from the laser beam 5 and the laser beam 5 is not applied to the filler wire 13 as shown in FIG. 5A, a case when the filler wire 13 is exactly positioned at the abutting portion 4 while the laser beam 5 is fully deviated from the abutting portion 4 so that the laser beam 5 is fully deviated from the filler wire 13 and is not applied to the filler wire 13 as shown in FIG. 6A, and a case when the filler wire 13 and the the laser beam 5 are both fully deviated from the abutting portion 4 while the laser beam 5 is positioned at the center of the filler wire 13 as shown in FIG. 7A.

Especially, in the first case shown in FIG. 4A the second case not shown (which are the most common cases resulting the weld inferiority), corresponding to the direction of the relative deviation of the laser beam 5 from the filler wire 13, the welding plasma intensity of one side (e.g. left side in FIG. 4A) becomes stronger than the plasma intensities in case of the normal relative positions in FIG. 3A while the welding plasma intensity of another side becomes weaker than the plasma intensities in case of the normal relative positions.

For example, during welding the members 2, 3 of the thickness being 0.8 mm by the laser beam 5 in the welding condition of the laser output power being 3.5 kw, the welding speed being 3.5 m/min. with the filler wire 13 of the diameter being 0.8 mm, if the weld inferiority occurs due to the deviation between the laser beam 5 and the filler wire 13, it is clarified by the inventors that the welding plasma intensity is varied equal to $\pm 15\%$ or more than $\pm 15\%$ from the welding plasma intensity in case of the normal relative positions as shown in FIG. 3A, therefore the weld inferiority can be detected by recognizing the the variation of the welding plasma intensity equal to $\pm 15\%$ or more than $\pm 15\%$ from the welding plasma intensity in case of the normal relative positions.

In the welding device 1, utilizing such the experimental principle, first the data analyzer 11 detects the direction of the relative deviation between the laser beam 5 and the filler wire 13 based on the difference between the present welding plasma intensities from the lefthand and righthand plasma sensors 8, 9 and based on the difference between each of the present welding plasma intensities and the welding plasma intensity in case of the normal relative positions, then the direction data of the relative deviation between the laser beam 5 and the filler wire 13 is supplied to the machining control device 12 and the machining control device 12 carry out feedback control of the actuator 16 based on the direction data so as to move the wire feeding nozzle 14 to the direction compensating for the relative deviation between the laser beam 5 and the filler wire 13 to correct the relative position between the laser beam 5 and the filler wire 13, thus normal welding can be carried out.

Due to the propensity of self bending of the filler wire 13 and high accuracy of the optical system 18, the welding device 1 has a tendency toward the condition where the laser beam 5 is exactly positioned at the abutting portion 4 while the filler wire 13 is slightly deviated from the abutting portion 4. Therefore, the welding device 1 first tries to control the position of the wire feeding nozzle 14 as mentioned above, though, if it is difficult to control the position of the wire feeding nozzle 14 due to an interference with with a machining jig or the member, the machining control device 12 can also carry out feedback control of the correcting driver 21 based on the direction data so as to move the the machining head 6 to the direction compensating for the relative deviation between the laser beam 5 and the filler wire 13 to correct the relative position between the laser beam 5 and the filler wire 13, thus normal welding can be carried out.

It is to be noted that, in the latter case, the laser beam 5 is slightly deviated from the abutting portion 4, though, it is clarified that such a slight deviation gives no influence to the weld quality.

Thus, by the welding device 1, the occurrence of weld inferiority due to the relative deviation between the applying area of the laser beam and the filler wire can be effectively prevented, thereby scrapped inferior members can be decreased providing a reduction of costs of materials and an improvement of weld efficiency.

In the cases shown in FIG. 5A, FIG. 6A and FIG. 7A which are rare, it is clarified that the welding plasma intensities of both sides is varied equal to $\pm 15\%$ more than $\pm 15\%$ from the welding plasma intensity in case of the normal relative positions as shown in FIG. 3A, therefore in such the cases, the feedback control can not be carried out because the direction of the the relative deviation can not be detected while the weld inferiority can be detected by recognizing the the variations of both of the welding plasma intensities, so that it can be prevented to supply inferior goods to a posterior manufacturing process.

Although the invention has been described with reference to the drawings, this does not imply that the invention is limited to the embodiment shown in the drawings. The invention likewise relates to all embodiments which deviate from those shown in the drawings but fall within the scope defined by the claims.

For example, though the detection of weld inferiority is based on the variation of $\pm 15\%$ or more than $\pm 15\%$ of the welding plasma intensity in the above mentioned embodiment, the base value of the variation of the welding plasma intensity should be determined in case by case because the base value may be changed with the diameters of the laser beam and the filler wire.

Further, as the relative position correcting means, instead of the actuator 16 which is mechanically independent from the driver 21, an actuator which mechanically connects the wire feeding nozzle 14 to the the machining head 6 and corrects the the relative position between the laser beam 5 and the filler wire 13 may be provided.

What is claimed is:

1. A welding device, comprising:
   a local heat supply for locally heating and melting surfaces of members to weld the members;
   a wire supply means for supplying a filler wire to the locally heated portion of the surfaces;
   a plasma intensity measuring means for measuring welding plasma intensities from both sides of the locally heated portion with reference to an advancing direction of the welding; and
   a relative position correcting means for correcting the relative position between the filler wire and the local heat supply so as to maintain a magnitude of a difference between the welding plasma intensities measured from both sides of the locally heated portion lower than a certain value.

* * * * *